(12) United States Patent
Dubiel et al.

(10) Patent No.: US 10,786,788 B2
(45) Date of Patent: Sep. 29, 2020

(54) FLUID INJECTION SYSTEM WITH FERTIGATION BASKET

(71) Applicant: Chapin Manufacturing, Inc., Batavia, NY (US)

(72) Inventors: David Dubiel, N. Chili, NY (US); Edward Horeth, Rochester, NY (US); James R. Fontaine, Marilla, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 84 days.

(21) Appl. No.: 16/224,900

(22) Filed: Dec. 19, 2018

(65) Prior Publication Data

US 2019/0134571 A1    May 9, 2019

Related U.S. Application Data

(63) Continuation-in-part of application No. 15/807,265, filed on Nov. 8, 2017.

(51) Int. Cl.

| | |
|---|---|
| *B01F 1/00* | (2006.01) |
| *A01C 23/00* | (2006.01) |
| *A01C 23/02* | (2006.01) |
| *A01M 7/00* | (2006.01) |
| *A01C 23/04* | (2006.01) |

(52) U.S. Cl.
CPC .......... *B01F 1/0033* (2013.01); *A01C 23/007* (2013.01); *A01C 23/008* (2013.01); *A01C 23/023* (2013.01); *A01C 23/042* (2013.01); *A01M 7/00* (2013.01); *A01M 7/0089* (2013.01); *B01F 2001/0088* (2013.01); *B01F 2001/0094* (2013.01); *B01F 2215/0055* (2013.01)

(58) Field of Classification Search
CPC ............ B01F 1/0033; B01F 2215/0055; B01F 2001/0088; B01F 2001/0094; A01C 23/007; A01C 23/008; A01C 23/023; A01C 23/042; A01M 7/00; A01M 7/0089
See application file for complete search history.

(56) References Cited

U.S. PATENT DOCUMENTS

| | | | |
|---|---|---|---|
| 1,796,407 A | | 3/1931 | Shuldener |
| 1,987,847 A | * | 1/1935 | Flood .................. B01D 27/005 210/167.32 |

(Continued)

FOREIGN PATENT DOCUMENTS

| | | |
|---|---|---|
| WO | 2005095722 | 10/2005 |

*Primary Examiner* — Jessica Cahill
*Assistant Examiner* — Patrick C Williams
(74) *Attorney, Agent, or Firm* — Woods Oviatt Gilman LLP; Katherine H. McGuire, Esq.

(57) ABSTRACT

A fluid injection system includes a container, fluid injection device and a fertigation basket. The fluid injection device includes a housing having a flow tube having an inlet end and an outlet end. A shroud is positioned between the inlet end and the outlet end and redefines at least a portion of the fluid pathway as a constricted fluid pathway. A diverter port is between the inlet end and the shroud and diverts a portion of the inlet fluid into the container. An injection port is between the shroud and the outlet end and receives an injection tube. The fertigation basket holds dry product which is dissolved into the container to be drawn out of outlet end via the injection tube.

13 Claims, 13 Drawing Sheets

(56) References Cited

U.S. PATENT DOCUMENTS

| | | | | |
|---|---|---|---|---|
| 3,060,956 A | * | 10/1962 | Menzie | C02F 1/686 |
| | | | | 137/205.5 |
| 4,061,572 A | * | 12/1977 | Cohen | B01D 37/025 |
| | | | | 210/206 |
| 4,347,224 A | | 8/1982 | Beckert et al. | |
| 5,303,729 A | | 4/1994 | DeMarco | |
| 5,957,379 A | | 9/1999 | McMorrow et al. | |
| 6,325,925 B1 | | 12/2001 | Hansen | |
| 6,546,949 B1 | | 4/2003 | Gilmore | |
| 6,589,461 B2 | | 7/2003 | Hansen | |
| 6,604,546 B1 | | 8/2003 | Gilmore | |
| 6,659,117 B2 | | 12/2003 | Gilmore | |
| 6,902,668 B2 | | 6/2005 | Benham | |
| 7,674,313 B2 | | 3/2010 | Jordan et al. | |
| 7,690,392 B1 | | 4/2010 | Sarkiss | |
| 8,210,451 B1 | * | 7/2012 | Gooch | A01C 23/042 |
| | | | | 137/268 |
| 8,297,535 B1 | | 10/2012 | Reid | |
| 8,647,483 B2 | | 2/2014 | Andrews et al. | |
| 2007/0145162 A1 | | 6/2007 | Macmahon et al. | |

\* cited by examiner

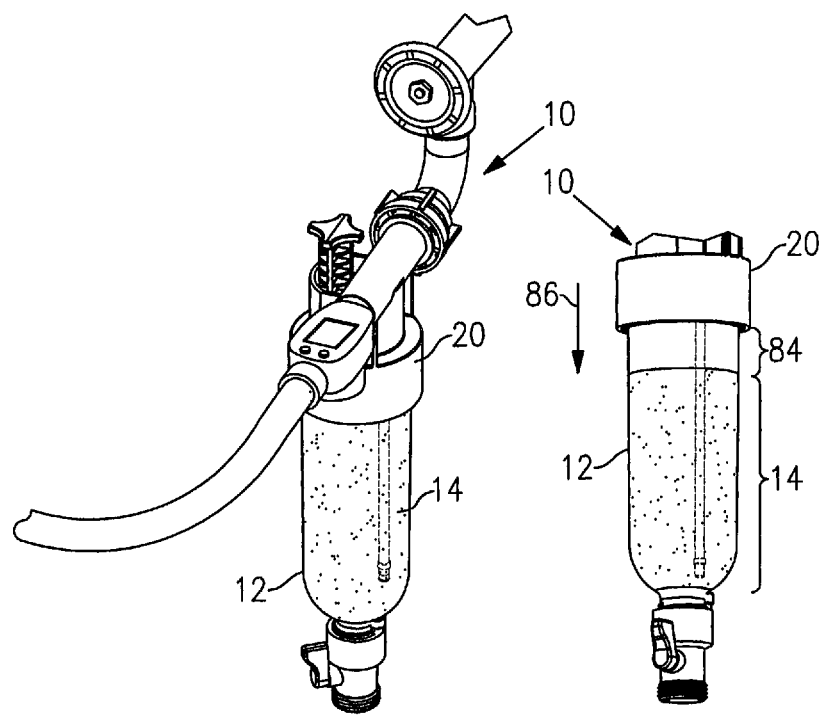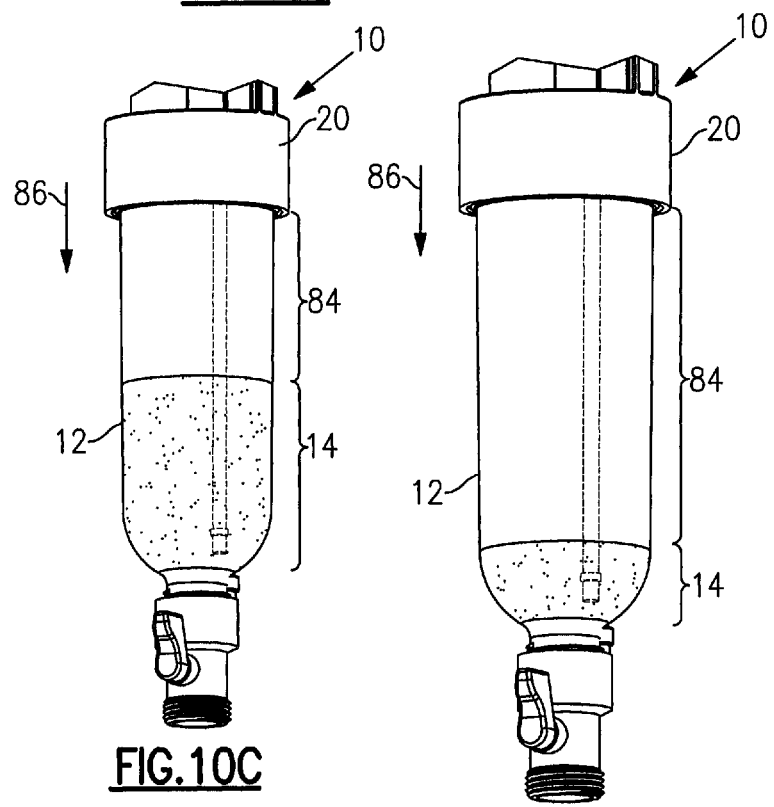
FIG.10A   FIG.10B   FIG.10C   FIG.10D

FLUID INJECTION SYSTEM WITH FERTIGATION BASKET

CROSS REFERENCE TO RELATED APPLICATIONS

This application is a continuation-in-part of pending U.S. patent application Ser. No. 15/807,265 filed Nov. 8, 2017, entitled "FLUID INJECTION SYSTEM," the contents of which are fully incorporated herein.

FIELD OF THE INVENTION

The present invention generally relates to fluid injection systems for dispensing a dry product from a container, and more particularly to a fluid injection system having a fertigation basket in communication with a flow tube for directing a portion of a feeder fluid through the basket to dissolve the dry product which is then injected into the fluid stream.

BACKGROUND OF THE INVENTION

Fluid injection systems, such as sprayers, suffer from a number of drawbacks. First, current systems fail to accurately inject product at the desired rate and concentration. For instance, some systems require continuous dilution of the product within the container prior to spraying. As such, the concentration of product being dispensed decreases over time. These and other systems are also unable to inject small, continuous quantities of product into the feeder fluid so as to produce a diluted product at low concentration. Instead, such systems periodically inject discrete aliquots of product into the fluid stream. Alternative systems divert a portion of the feeder fluid from the fluid path and use this portion to push product out of the container and into the fluid stream. However, such systems require multiple components making adjusting the feed rate and resultant dilution difficult and time consuming.

Thus, there remains a need for an irrigation injector system configured to dispense a diluted product at a fixed metering rate. The present invention satisfies these, as well as other, needs.

SUMMARY OF THE INVENTION

In view of the above and in accordance with an aspect of the present invention, the present invention is generally directed to a fluid injection device configured for use with a container defining a cavity for receiving a product to be dispersed therefrom. The fluid injection device may comprise a housing adapted to mount onto the container, wherein the housing includes a flow tube defining a fluid pathway. The flow tube may have an inlet end configured to receive a feeder fluid and an outlet end configured to discharge a mixed fluid comprising the product and feeder fluid. A shroud may be positioned an intermediate distance between the inlet end and the outlet end and have a first end and a second end defining a ramped surface therebetween. The shroud may redefine at least a portion of the fluid pathway as a constricted fluid pathway. A diverter port may be located between the inlet end and the shroud. The diverter port may be configured to divert a portion of the feeder fluid from the inlet end into the container. An injection port may be located between the shroud and the outlet end and may be configured to receive the product from the container. The first end of the shroud may include a step defining a notch between the first end of the shroud and an inner wall of the flow tube. The notch is in fluid communication with the diverter port. The second end of the shroud may define a recess wherein the recess is in fluid communication with the injection port.

In a further aspect of the present invention, the flow tube may further include a weir adjacent to the shroud. The weir may further redefine at least a portion of the constricted fluid pathway as a further constricted fluid pathway. The housing may also further include a fill port configured to communicate with the cavity of the container and provide passage therethrough for refill product. A fill plug may be configured to threadably engage the fill port to form a fluid-tight seal. The housing may further include a collar configured to couple with an open mouth of the container. The collar may include threads configured to threadably engage mating threads defined on the mouth of the container.

In accordance with another aspect of the present invention, the present invention may be directed to a fluid injection system comprising a container configured to hold a product to be dispersed and a fluid injection device removably coupled to the container. The fluid injection device may comprise a housing adapted to mount onto the container, wherein the housing includes a flow tube defining a fluid pathway. The flow tube may have an inlet end configured to receive a feeder fluid and an outlet end configured to discharge a mixed fluid comprising the product and feeder fluid. A shroud may be positioned an intermediate distance between the inlet end and the outlet end and have a first end and a second end defining a ramped surface therebetween. The shroud may redefine at least a portion of the fluid pathway as a constricted fluid pathway. A diverter port may be located between the inlet end and the shroud. The diverter port may be configured to divert a portion of the feeder fluid from the inlet end into the container. An injection port may be located between the shroud and the outlet end and may be configured to receive the product from the container. The first end of the shroud may include a step defining a notch between the first end of the shroud and an inner wall of the flow tube. The notch is in fluid communication with the diverter port. The second end of the shroud may define a recess wherein the recess is in fluid communication with the injection port.

In accordance with a further aspect of the present invention, the flow tube may further include a weir adjacent to the shroud. The weir may further redefine at least a portion of the constricted fluid pathway as a further constricted fluid pathway. The housing may also further include a fill port configured to communicate with the cavity of the container and provide passage therethrough for refill product. A fill plug may be configured to threadably engage the fill port to form a fluid-tight seal. The housing may further include a collar configured to couple with an open mouth of the container. The collar may include threads configured to threadably engage mating threads defined on the mouth of the container.

In a further aspect of the present invention, the container may further include a drain port including a drain in fluid communication with the cavity of the container. The container may further include a valve coupled to the drain port wherein the valve is selectively movable from a first position wherein the drain is closed to a second position wherein the drain is open. The valve may be a ball valve or a stopcock valve. An injection tube may have a first end coupled to the injection port and a second end proximate the drain port. A filter may be coupled to the second end of the injection tube.

In still another aspect of the present invention, the container may be constructed of a transparent or translucent polymer material, such as high-density polyethylene, polycarbonate, polyethylene terephthalate, poly(methyl methacrylate), polypropylene, polyvinyl chloride and copolymers thereof.

In accordance with a further aspect of the present invention, the present invention may be directed to a fluid injection system having a container, fluid injection device and fertigation basket. The container has a sidewall, bottom wall and open top perimeter defining a cavity. The fluid injection device is removably coupled about the top perimeter of container and includes a housing and an injection tube. The housing is adapted to mount onto the container and includes a flow tube defining a fluid pathway. The flow tube has an inlet end configured to receive a feeder fluid, an outlet end configured to discharge a mixed fluid comprising the product and feeder fluid, a shroud positioned an intermediate distance between the inlet end and the outlet end, wherein the shroud has a first end and a second end defining a ramped surface therebetween whereby the shroud redefines at least a portion of the fluid pathway as a constricted fluid pathway, a diverter port between the inlet end and the shroud, wherein the diverter port is configured to divert a portion of the feeder fluid from the inlet end into the container, and an injection port between the shroud and the outlet end. The injection tube has a first end coupled to the injection port and an opposing second end extending into the cavity and terminating an intermediate distance above the bottom wall of the container. The fertigation basket is configured to hold a dry product and includes a top collar configured to mount to the open top perimeter of the container between the container and the fluid injection device housing whereby the diverted portion of the feeder fluid is directed into the fertigation basket to dissolve the dry product; inner and outer basket sidewalls coaxially aligned along the longitudinal axis of the basket and extending into the cavity of the container, wherein the inner basket sidewall has an internal diameter defining a channel slightly larger than the outer diameter of the injection tube, and wherein the outer basket sidewall has an external diameter slightly smaller than the internal of the container sidewall; and a basket bottom extending between bottom edges of the inner and outer basket sidewalls, wherein the injection tube is configured to pass through channel with the second end of the injection tube extending outwardly of the basket bottom. One or both of the outer basket sidewall and basket bottom define a plurality of openings whereby dissolved product passes out of the fertigation basket and into the container. The injection tube is configured to transport the dissolved product from the container to the outlet end of the flow tube.

In accordance with another aspect of the present invention, the openings are selected to be smaller than a particle diameter of the dry product. By way of example, the outer basket sidewall includes a first wall surface and an opposite second wall surface, wherein the first wall surface includes vertically extending, spaced grooves extending through a first portion of the outer basket sidewall, and wherein the second wall surface includes horizontally extending, spaced grooves extending through a second portion of the outer basket sidewall whereby the openings are formed where the vertically extending, spaced grooves coincide with the horizontally extending, spaced grooves.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

FIGS. 10A-10D are exemplary sequential photographs of a fluid injection system in accordance with the present invention in use; with FIG. 10A showing a container full of product, FIG. 10B showing the container partially filled with a feeder fluid with the remainder being product, FIG. 10C showing the container approximately half filled with feeder fluid and product, and FIG. 10D showing the container mostly filled with water with the remainder being product.

DETAILED DESCRIPTION OF THE PREFERRED EMBODIMENTS

Figure 1:
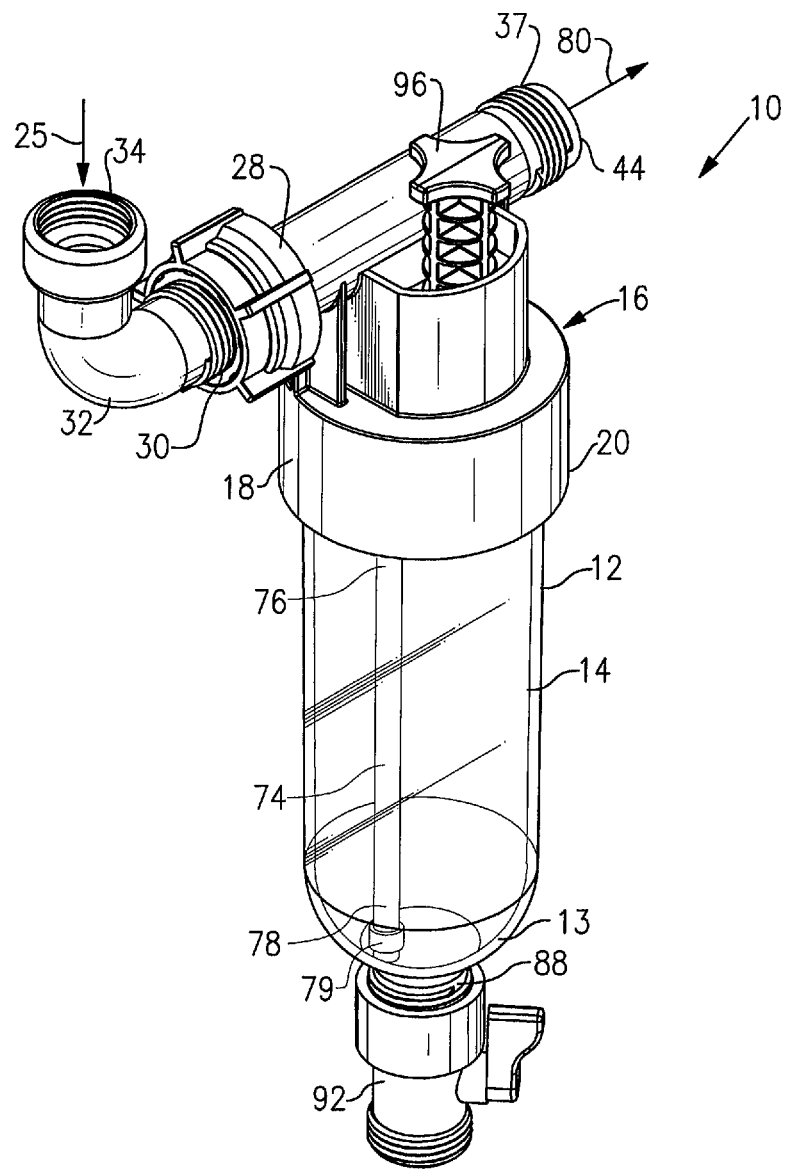
FIG. 1 is a perspective view of an embodiment of a fluid injection system in accordance with the present invention.
Figure 2:
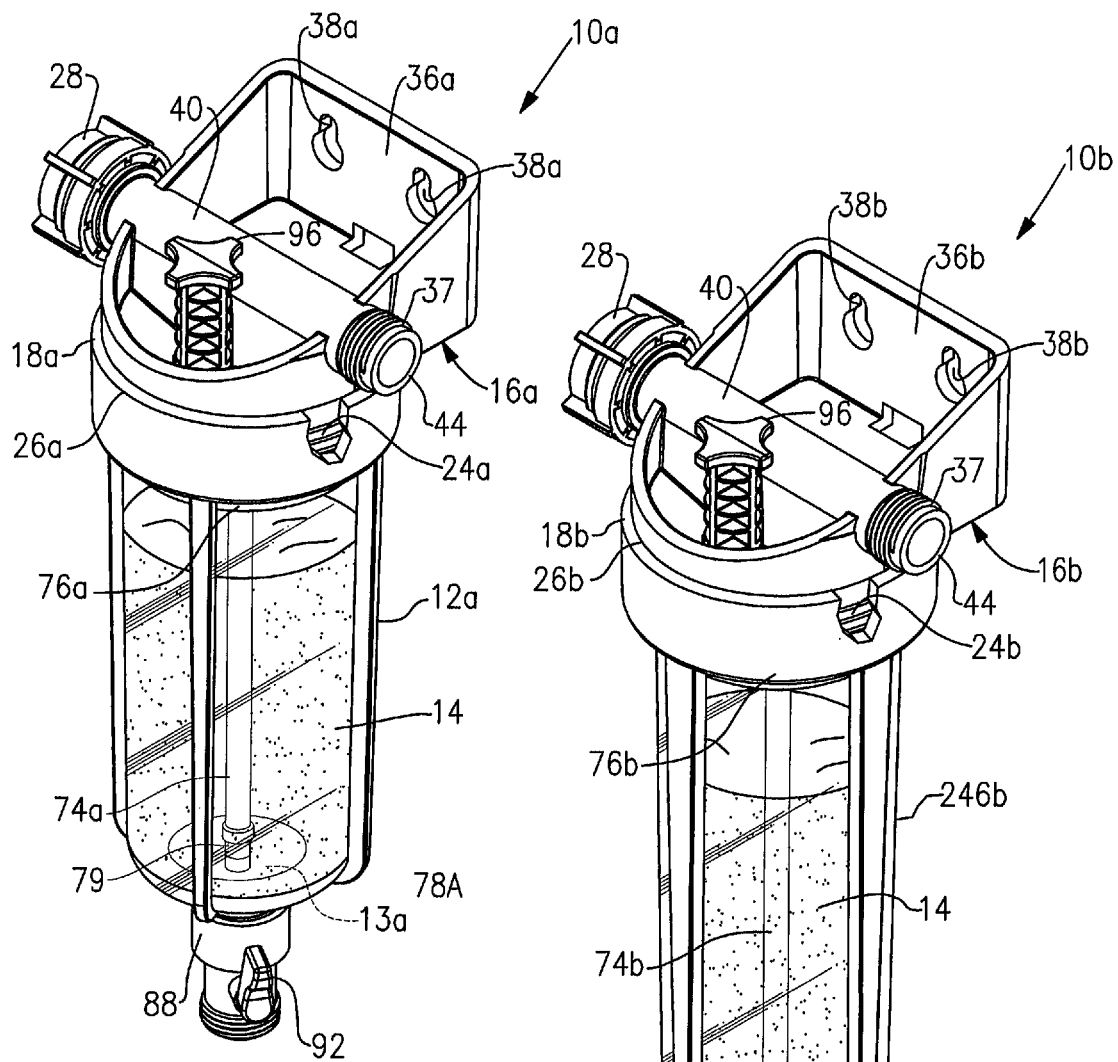
FIG. 2 is a perspective view of an alternative embodiment of a fluid injection system in accordance with the present invention.
Figure 3:
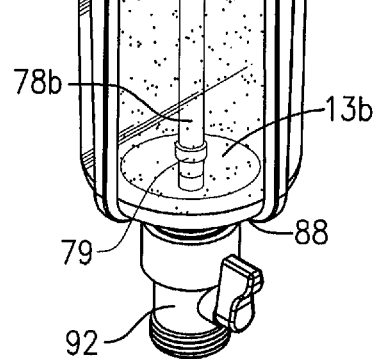
FIG. 3 is a perspective view of another alternative embodiment of a fluid injection system in accordance with the present invention.

Referring now to FIGS. 1-3, there are shown respective exemplary fluid injection systems 10, 10a, 10b in accordance with an aspect of the present invention. Each fluid injection system 10, 10a, 10b may generally include a respective container 12, 12a, 12b configured to hold a product 14 therein. Containers 12, 12a, 12b may possess different capacities whereby a user may select a fluid injection system 10, 10a or 10b most suitable to its intended use. Product 14 may be a dry soluble product or may be a product solution. Non-limiting examples of suitable products may include pesticides, herbicides or fertilizers. Coupled to each respective container 12, 12a, 12b is a respective fluid injection device 16, 16a, 16b. Each fluid injection device 16, 16a, 16b generally includes a respective housing 18, 18a, 18b.

Figure 4:
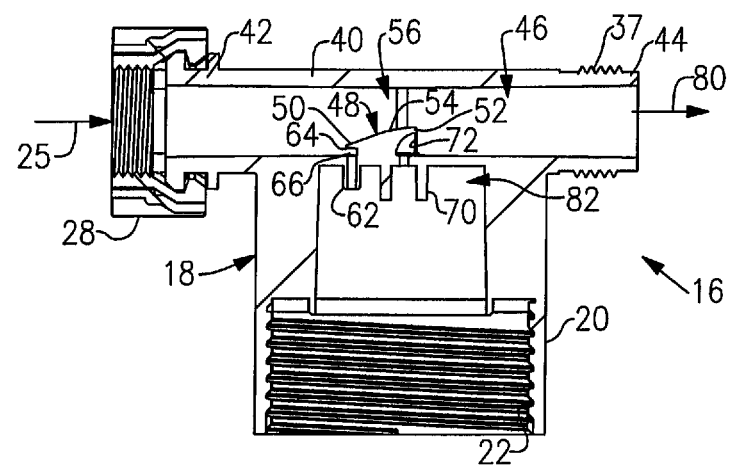
FIG. 4 is a longitudinal side cross section view of a housing configured for use with the fluid injection system shown in FIG. 1.
Figure 5:
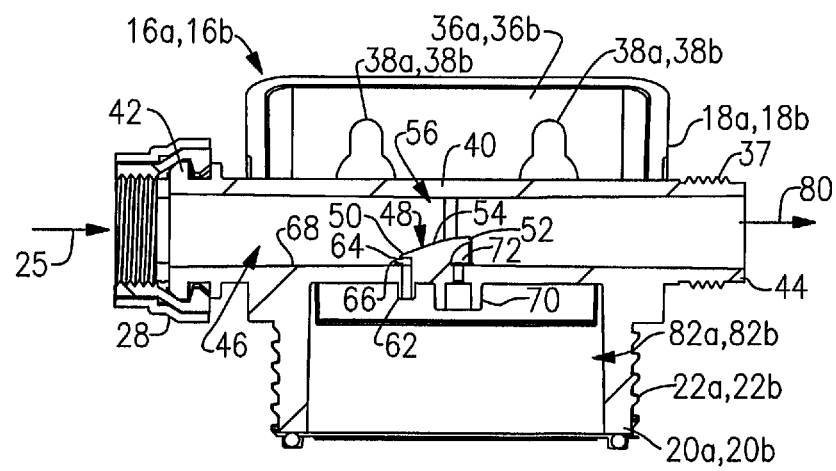
FIG. 5 is a longitudinal side cross section view of a housing configured for use with the fluid injection systems shown in FIGS. 2 and 3.
Figure 6:
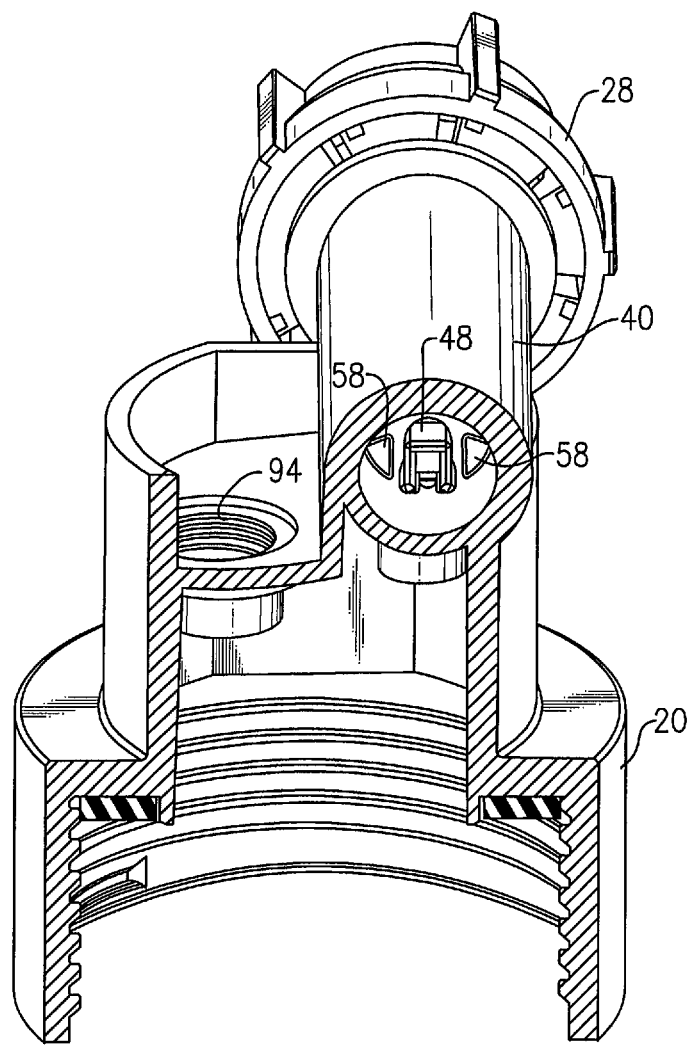
FIG. 6 is a transverse cross section view of a housing configured for use with the fluid injection system shown in FIG. 1.
Figure 7:
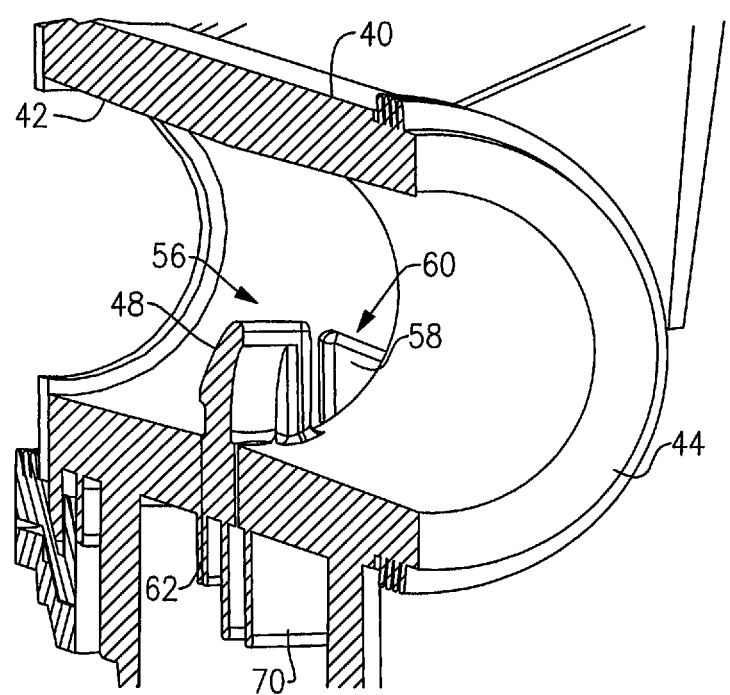
FIG. 7 is a perspective cross section view of the flow tube configured for use with the fluid injection systems shown in FIGS. 1-3.
Figure 8:
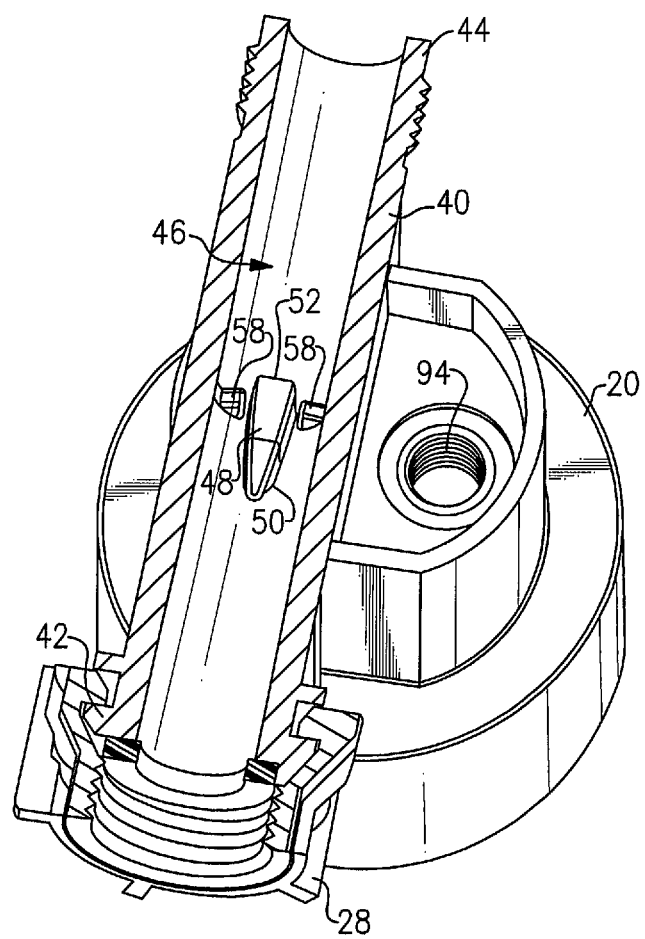
FIG. 8 is a longitudinal top perspective cross section view of a housing configured for use with the fluid injection system shown in FIG. 1.

By way of example, fluid injection system 10 may be a small capacity system (e.g., container 12 may have a 16 ounce capacity) such that housing 18 includes a collar 20 defining female threads 22 (see e.g., FIG. 4) which are configured to threadably engage mating male threads defined upon the mouth (not shown) of container 12. For larger capacity systems, such as system 10a which may have a 24 ounce capacity, or system 10b which may have a 32 ounce capacity, housing 18a, 18b may include a respective collar 20a, 20b defining male threads 22a, 22b (see e.g., FIG. 5) which are configured to threadably engage mating female threads 24a, 24b defined upon a respective mouth 26a, 26b of container 12a, 12b (see FIGS. 2 and 3).

Small capacity systems, such as fluid injection system 10, may be sufficiently light enough when container 12 is filled with fluid to be suspended directly from a hose bibb, such as a hose bibb mounted onto a building. To that end, housing 18 may include a coupling 28 configured to receive a first end 30 of mounting tube 32. Mounting tube 32 may then be directly coupled to the hose bibb (not shown) at second end 34. Larger capacity systems, such as fluid injection system 10a, 10b, however, may be too heavy to suspend directly from a hose bibb when container 12a, 12b is filled with fluid. To that end, each respective housing 18a, 18b may include a mounting flange 36a, 36b configured to releasably secure housing 18a, 18b (and thus fluid injection system 10a, 10b) to a post or other structure (not shown), such as via screws (not shown) passing through mounting holes 38a, 38b. Housing 18a, 18b may also include a coupling 28 configured to receive a hose (not shown), with the hose then being coupled to the hose bibb or another fluid supply. In this manner, the entire weight of fluid injection system 10a, 10b is not supported only by the hose bibb or mounting tube 32. In either event, a feeder fluid 25, such as water, may flow into fluid injection system 10, 10a, 10b during use as will be discussed in greater detail below.

With reference to FIGS. 1-5, each housing 18, 18a, 18b may include a flow tube 40 having an opposing inlet end 42 and outlet end 44 defining a fluid pathway 46 therebetween. As described above, each inlet end 42 may include a coupling 28 configured to couple housing 18, 18a, 18b with a hose bibb or other fluid supply. Outlet end 44 may define threads 37 whereby fluid injection system 10, 10a, 10b may be coupled to a desired downstream system component, such as without limitation, a delivery hose (not shown).

As shown most clearly in FIGS. 4-9, flow tube 40 may include a shroud 48 positioned an intermediate distance between inlet end 42 and outlet end 44, and in accordance with an aspect of the present invention, approximately equidistant between inlet end 42 and outlet end 44. Shroud 48 may include a first end 50 and a second end 52 defining a ramped surface 54 therebetween. In this manner, shroud 48 may redefine at least a portion of the fluid pathway 46 as constricted fluid pathway 56 as will be discussed in greater detail below. To further restrict constricted fluid pathway 56, flow tube 40 may further include one or more weirs 58 adjacent to shroud 48 so as to define a further constricted fluid pathway 60.

With continued reference to FIGS. 4-9, flow tube 40 may also include a diverter port 62 located between inlet end 42 and shroud 48. Diverter port 62 is configured to divert a portion of feeder fluid 25 received from inlet end 42 into container 12, 12a, 12b. To that end, first end 50 of shroud 48 may include a step 64 defining a notch 66 between first end 50 and inner wall 68 of flow tube 40. Notch 66 is in fluid communication with diverter port 62 such that a portion of feeder fluid 25 may be directed into container 12, 12a, 12b.

Flow tube 40 may also include an injection port 70 between shroud 48 and outlet end 44. To that end, second end 52 of shroud 48 may define a recess 72 wherein recess 72 is in fluid communication with injection port 70. Injection port 70 may then be configured to receive product 14 from the container as will be described in greater detail below.

As is known in the art, as feeder fluid 25 passes through constricted fluid pathway 56 (and/or further constricted fluid pathway 60), its velocity increases resulting in a decrease in pressure which manifests as a partial vacuum proximate second end 52 of shroud 48 and the area of flow tube 40 immediately downstream thereof. This partial pressure operates to draw fluid from container 12, 12a, 12b through injection port 70 into flow tube 40. To that end, an injection tube 74, 74a, 74b may be coupled to injection port 70 at a first end 76, 76a, 76b while a second end 78, 78a, 78b is disposed within product 14 (see e.g., FIGS. 1-3). In accordance with an aspect of the present invention, second end 78, 78a, 78b terminates at or near bottom wall 13, 13a, 13b of container 12, 12a, 12b so as to inject nearly all of product 14 and limiting its waste. In this manner, as feeder fluid 25 flows through constricted fluid pathway 56 (and/or further constricted fluid pathway 60) and thereby creates the partial vacuum at and immediately following second end 52 of shroud 48, product 14 may be drawn from container 12, 12a, 12b through injection tube 74, 74a, 74b into flow tube 40. Product 14 may then mix with feeder fluid 25 within flow tube 40 so as to produce a mixed fluid 80 that is discharged through outlet end 44. Second end 78, 78a, 78b of injection tube 74, 74a, 74b may be coupled to a filter 79 so as to minimize or prevent introduction of particulate matter into flow tube 40.

Figure 9:
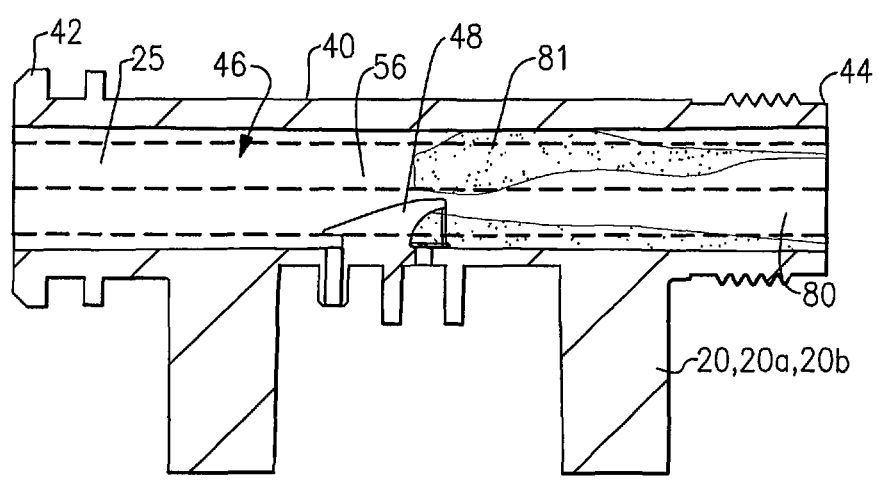
FIG. 9 is a longitudinal cross section view of the flow tube configured for use with the fluid injection systems shown in FIGS. 1-3 showing the flow velocity of fluid within the flow tube.

An exemplary computer model of this phenomenon using an embodiment of flow tube 40 with shroud 48 and weirs 58 in accordance with an aspect of the present invention is shown in FIG. 9. As can be seen in FIG. 9, a relatively slow flowing feeder fluid 25 moves left to right from inlet end 42 to outlet end 44. Upon flowing past constricted fluid pathway 56 (and/or further constricted fluid pathway 60), the flow velocity of feeder fluid 25 increases as generally indicated by the dark gray gradient 81. Product 14 is then drawn through injection port 70 at low velocity due to the partial vacuum created via the venturi effect generated by constricted fluid pathway 56 (and/or further constricted fluid pathway 60). Product 14 may then mix with feeder fluid 25 before mixed fluid 80 exits outlet end 44 at or about the initial velocity of feeder fluid 25 entering via inlet end 42.

Upon drawing of product 14 through injection tube 74, 74a, 74b as described above, the interior headspace 82, 82a, 82b of container 12, 12a, 12b/housing 18, 18a, 18b (see FIGS. 4 and 5) will experience a negative internal pressure/partial vacuum which may aid diversion of a portion of feeder fluid 25 through diverter port 62 into container 12, 12a, 12b as described above. As shown in FIG. 10A-10D, the portion of feeder fluid 25 is deposited within the container (such as, for example, container 12) where it may, in accordance with an aspect of the present invention, form a liquid layer 84 (generally indicated by the light color) layered atop product 14 (generally indicated by the dark color). Liquid layer 84 may operate to apply a downward force (shown generally as arrow 86) upon product 14 without significantly diluting product 14 (some minimal dilution may occur at the boundary between liquid layer 84 and product 14, but bulk dilution may be avoided). The rate of deposition of feeder fluid 25 (and development of liquid layer 84), as well as the rate of withdrawal of product 14 via injection port 70, is determined by the flow rate of feeder fluid 25 entering inlet end 42 and the size of constricted fluid pathway 56 (and/or further constricted fluid pathway 60). Diverter port 62 and injection port 70 may operate to equalize pressure in container 12, 12a, 12b such that fluid injection device 16, 16a, 16b may be generally referred to as a push-pull injector.

As can be seen in the sequence shown in FIGS. 10A-10D, product 14 is continually injected into flow tube 40 as a portion of feeder fluid 25 is diverted into container 12, 12a, 12b. Thus, at some point container 12, 12a, 12b will need to be emptied of feeder fluid 25 and replenished with replacement product 14. To facilitate replenishment of product 14, container 12, 12a, 12b may include a drain port 88 including a drain in fluid communication with the interior cavity of container 12, 12a, 12b (see FIGS. 1-3). A valve 92 may be coupled to drain port 88 and be selectively movable from a first position wherein the drain is closed to a second position wherein the drain is open and feeder fluid 25 may flow out of container 12, 12a, 12b. By way of example and without limitation thereto, valve 92 may be a ball valve or a stopcock valve. Once feeder fluid 25 has been drained from container 12, 12a, 12b, valve 92 is placed in the first position. Housing 18, 18a, 18b may define a fill port 94 (see e.g., FIGS. 6 and 8) through which replacement product may pass into container without requiring removal of container 12, 12a, 12b from housing 18, 18a, 18b or housing 18, 18a, 18b from the coupled hose bibb. A fill plug 96 (see e.g., FIGS. 1-3) may seal fill port 94 when fluid injection device 16, 16a, 16b is in use so as to enable development of the negative internal pressure/partial vacuum within container 12, 12a, 12b as described above.

In accordance with an aspect of the present invention, container 12, 12a, 12b may be constructed of a transparent or translucent polymer material. Non-limiting examples include high-density polyethylene, polycarbonate, polyethylene terephthalate, poly(methyl methacrylate), polypropylene, polyvinyl chloride and copolymers thereof. Thus, provided that there is a discernible difference between feeder fluid 25 and product 14, a user may visually inspect container 12, 12a, 12b to determine if product 14 has been dispensed and in need of replenishment as described above.

Turning now to FIGS. 11-17, in accordance with a further aspect of the present invention, an alternative embodiment of a fluid injection system is generally indicated by reference numeral 100. Fluid injection system 100 is similar to fluid injection systems 10a, 10b described above and includes a container 112 and fluid injection device 116 with injection tube 174. However, fluid injection system 100 is configured to receive a dry product within a fertigation basket 200. It should be noted that while described as a fertigation basket, basket 200 may hold any suitable dry product including not only fertilizers, soil amendments or water amendments, but may also include dry chemicals, such as and without limitation to, pesticides, herbicides and/or fungicides. In accordance with one aspect of the present invention, fluid injection system 100 may be either fluid injection system 10a or 10b retrofitted to included provision of fertigation basket 200, as will be described in greater detail below. To that end, container 112 may be a distinct system component or may be container 12a or 12b. Similarly, fluid injection device 116 may be a distinct component of may be fluid injection device 16a or 16b. As such, container 112 and fluid injection device 116 have been described previously with regard to containers 12, 12a, 12b and fluid injection devices 16a, 16b and further discussion of these components will be limited to their interaction with fertigation basket 200.

Figure 11:
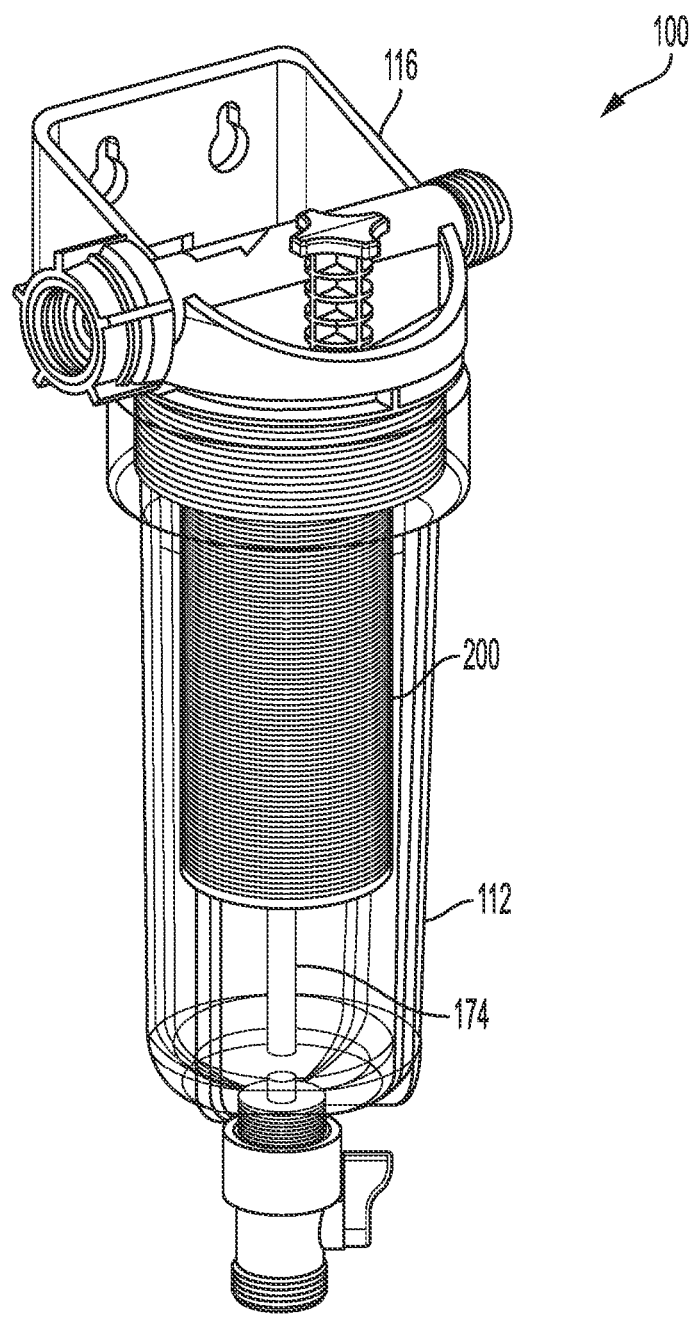
FIG. 11 is a perspective view of an embodiment of a fluid injection system for use with dry products in accordance with the present invention.
Figure 12:
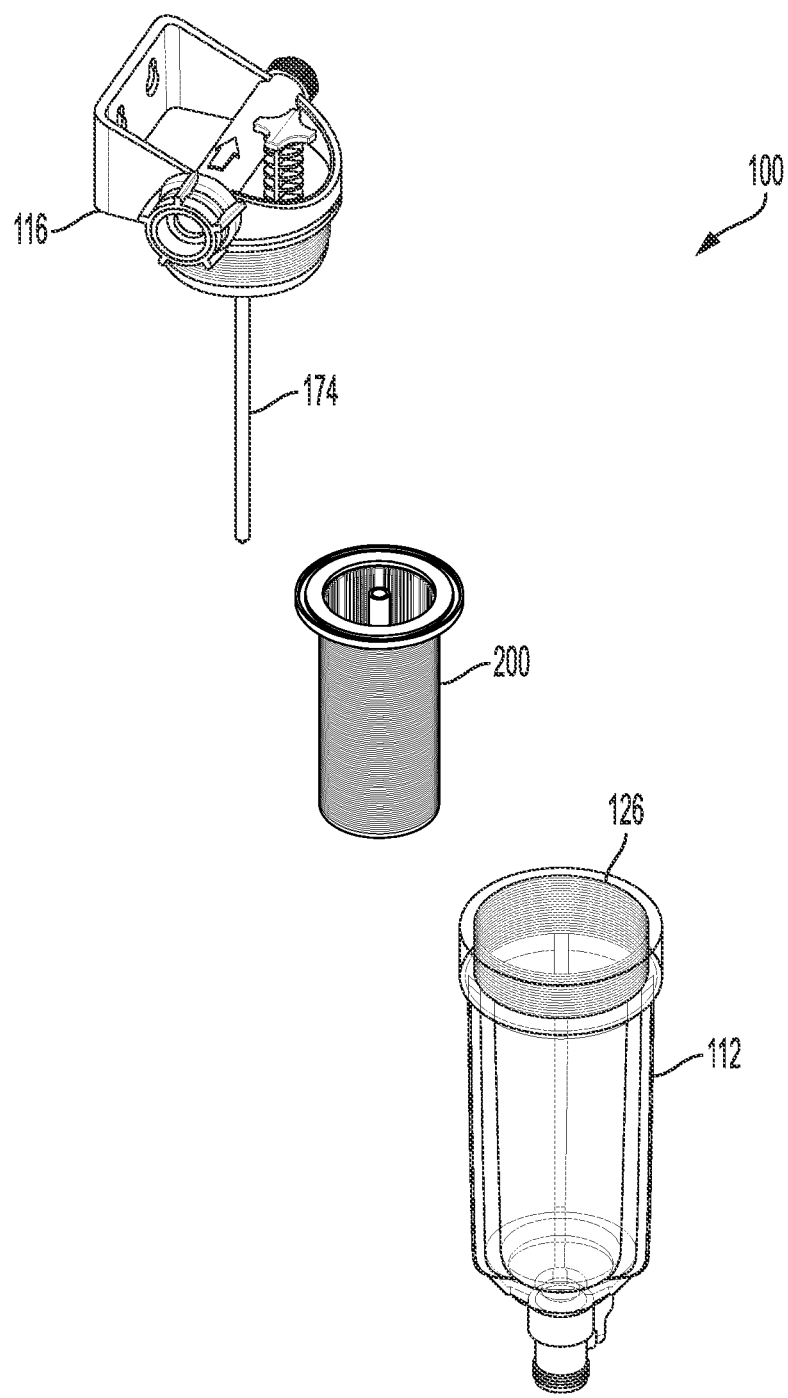
FIG. 12 is an exploded view of the fluid injection system shown in FIG. 11.
Figure 13:
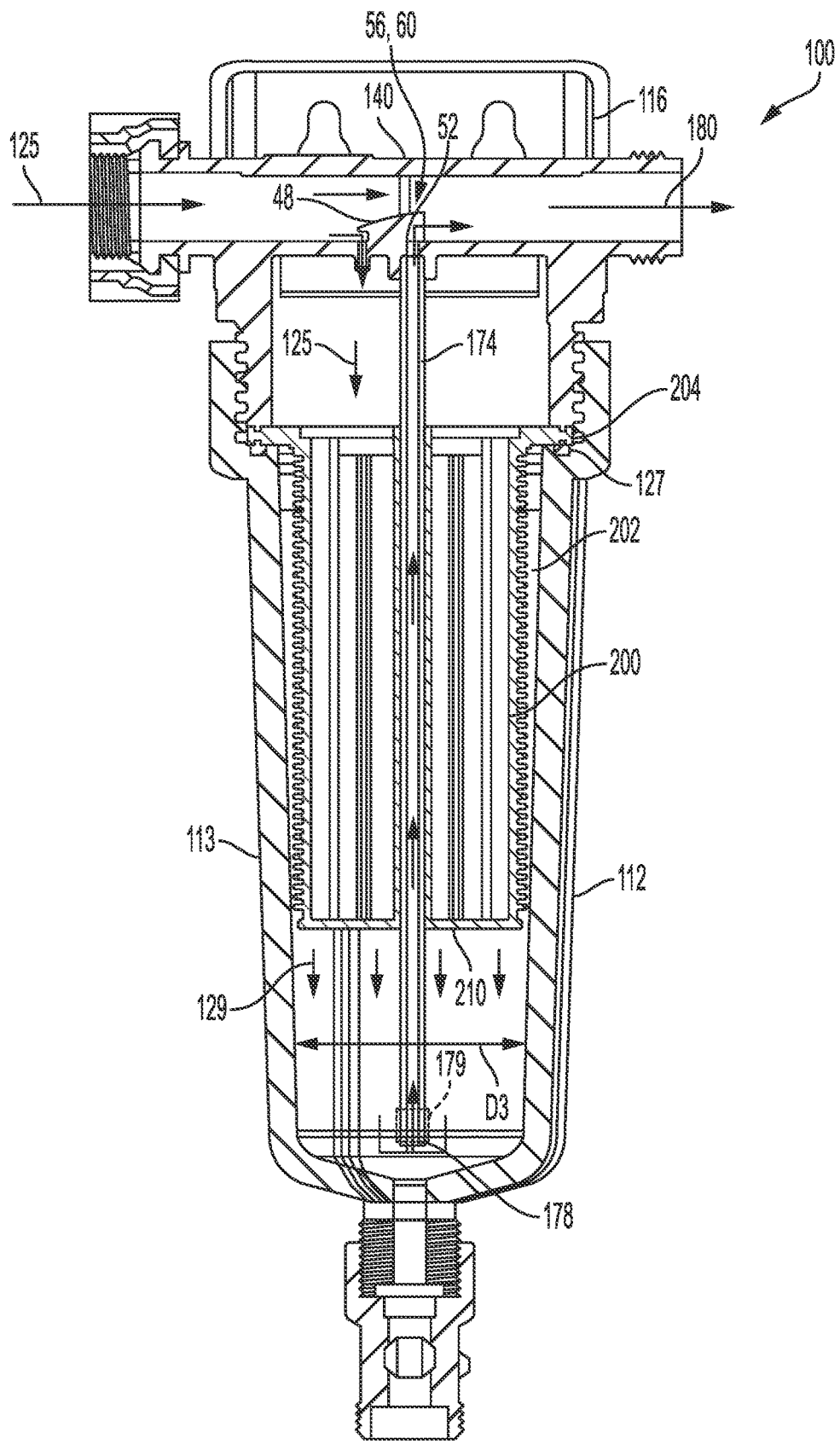
FIG. 13 is a longitudinal side cross section view of the fluid injection system shown in FIG. 11.
Figure 14:
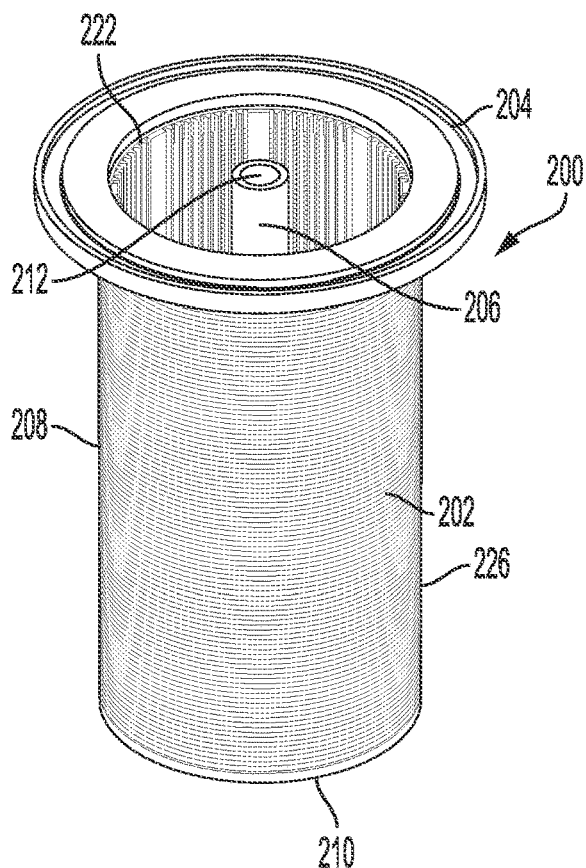
FIG. 14 is perspective view of a fertigation basket suitable for use within the fluid injection system shown in FIG. 11.
Figure 17:
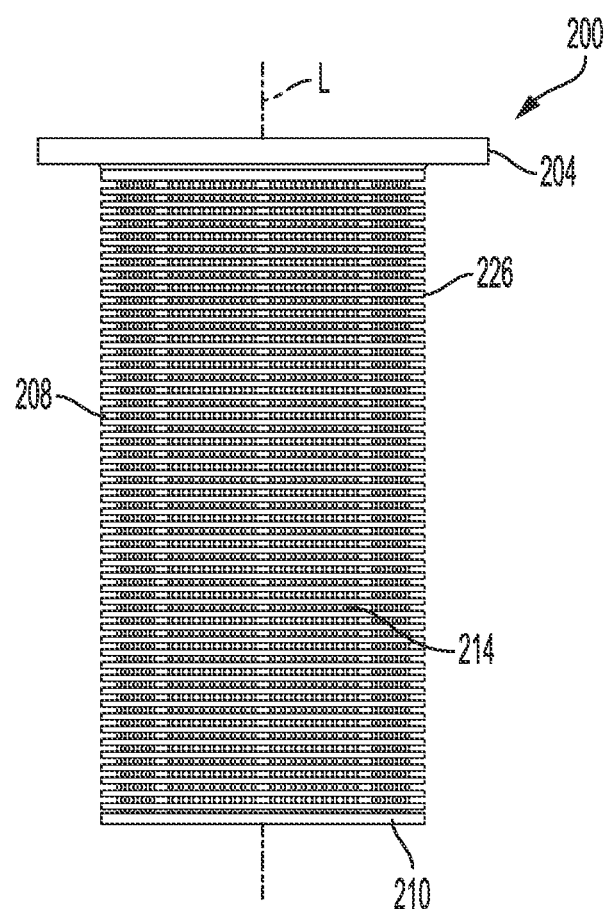
FIG. 17 is a side view of the fertigation basket shown in FIG. 14.

As shown in FIGS. 11 and 13, fertigation basket 200 is configured to nest within container 112 and may be held in place through the coupling of fluid injection device 116 with container 112. With reference to FIGS. 14-17, fertigation basket 200 includes a basket body 202 having a top collar 204 configured to mount within open top end 126 of container 112. To that end, open top end 126 may include a step 127 upon which is seated collar 204 such that the remainder of basket body 202 is suspended within the interior cavity defined by container 112. Basket body 202 further includes inner and outer basket sidewalls 206, 208, respectively. Inner and outer basket sidewalls 206, 208 are coaxially aligned along the longitudinal axis L of basket body 202 (FIG. 17). Basket bottom 210 extends between bottom edges 206a, 208a of inner and outer basket sidewalls 206, 208. Inner basket sidewall 206 has an internal diameter D1 which defines an open channel 212 along the entire length of basket body 202. Outer basket sidewall 208 has an external diameter D2 which is slightly smaller than the internal diameter D3 of container sidewall 113 (FIG. 13). Channel 212 is proportioned to receive injection tube 174 therein and allow passage of injection tube 174 therethrough such that terminal second end 178 of injection tube 174 extends outwardly from basket body 202 beyond basket bottom 210.

Figure 15:
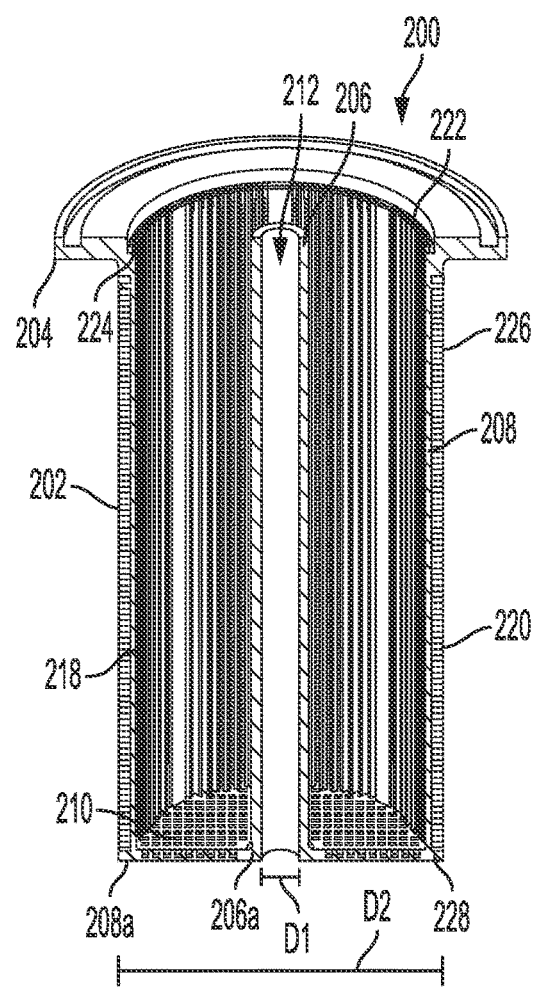
FIG. 15 is a longitudinal side cross section view of the fertigation basket shown in FIG. 14.
Figure 16:
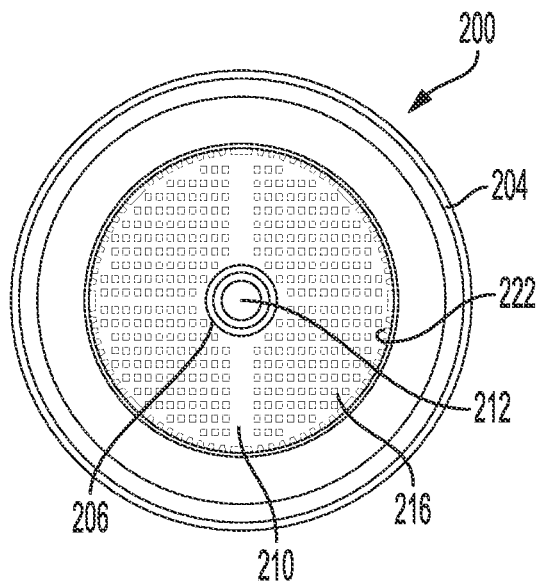
FIG. 16 is a top view of the fertigation basket shown in FIG. 14.

Fertigation basket 200 is configured to hold a dry product to be dissolved by a portion 125a of feeder fluid 125 which is directed into container 112 via fluid injection device 116 as will be described in greater detail below. Dissolved product then exits fertigation basket 200 and is injected within the fluid flow via injection tube 174. To that end, as shown most clearly in FIGS. 16 and 17, one or both of outer basket sidewall 208 and basket bottom 210 define a plurality of openings 214, 216, respectively. Openings 214 and 216 are selected to be smaller than a mean particle size of the dry product loaded within fertigation basket 200. By way of example and without limitation thereto, outer basket sidewall 208 may include a first wall surface 218 and an opposite second wall surface 220 (FIG. 15). First wall surface 218 may include vertically extending, spaced grooves 222 extending through a first portion 224 of the outer basket sidewall 208. Second wall surface 220 may include horizontally extending, spaced grooves 226 extending through a second portion 228 of the outer basket sidewall 208. Openings 214 may then be formed where the vertically extending, spaced grooves 222 coincide with the horizontally extending, spaced grooves 226.

With reference to FIG. 13, as described above with regards to FIGS. 4-9, a feeder fluid, such as feeder fluid 25/125, enters fluid injection device 16a, 16b/116, such as through inlet end 42/142. Referencing the above description, as feeder fluid 25/125 passes through constricted fluid pathway 56 (and/or further constricted fluid pathway 60), its velocity increases resulting in a decrease in pressure which manifests as a partial vacuum proximate second end 52 of shroud 48 and the area of flow tube 40/140 immediately downstream thereof. See FIGS. 4-9. This partial pressure operates to draw fluid from container 12, 12a, 12b through injection tube 74a, 74b/174 into flow tube 40/140. As described above, fluid within container 112 (or 12a, 12b) comprises dry product which has been dissolved within the portion 125a of feed fluid 125 which is directed into container 112. The dissolved dry product solution 129 may then mix with feeder fluid 125 within flow tube 140 so as to produce a mixed fluid 180 that is discharged through outlet end 144. Second end 178 of injection tube 174 may be coupled to a filter 179 so as to minimize or prevent introduction of particulate matter into flow tube 140.

In view of the above, the size and surface area of fertigation basket 200, as well as the number, location and size of openings 214, 216, are of critical importance. The surface area of fertigation basket 200 is such that it allows for dissolution of the dry product within the basket without creating appreciable resistive losses. As a result, fluid injection system 100 stratifies the dissolved dry product solution 129 deposited within container 112 for consistent concentration rates over time.

Similar to containers 12, 12a, 12b described above, container 112 may also be constructed of a transparent or translucent polymer material. Non-limiting examples include high-density polyethylene, polycarbonate, polyethylene terephthalate, poly(methyl methacrylate), polypropylene, polyvinyl chloride and copolymers thereof.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A fluid injection system comprising:
   a. a container having a sidewall, bottom wall and open top perimeter defining a cavity;
   b. a fluid injection device removably coupled about the top perimeter of container, the fluid injection device comprising:
      i) a housing adapted to mount onto the container, wherein the housing includes a flow tube defining a fluid pathway, the flow tube having:
         a) an inlet end configured to receive a feeder fluid;
         b) an outlet end configured to discharge a mixed fluid comprising the product and feeder fluid;
         c) a shroud positioned an intermediate distance between the inlet end and the outlet end, wherein the shroud has a first end and a second end defining a ramped surface therebetween whereby the shroud redefines at least a portion of the fluid pathway as a constricted fluid pathway;
         d) a diverter port between the inlet end and the shroud, wherein the diverter port is configured to divert a portion of the feeder fluid from the inlet end into the container;
         e) an injection port between the shroud and the outlet end; and
      ii) an injection tube having a first end coupled to the injection port and an opposing second end extending into the cavity and terminating an intermediate distance above the bottom wall of the container; and
   c. a fertigation basket configured to hold a dry product including:
      i) a top collar configured to mount to the open top perimeter of the container between the container and the fluid injection device housing whereby the diverted portion of the feeder fluid is directed into the fertigation basket to dissolve the dry product;
      ii) inner and outer basket sidewalls coaxially aligned along the longitudinal axis of the basket and extending into the cavity of the container, wherein the inner basket sidewall has an internal diameter defining a channel larger than the outer diameter of the injection tube, and wherein the outer basket sidewall has an external diameter smaller than an internal diameter of the container sidewall; and
      iii) a basket bottom extending between bottom edges of the inner and outer basket sidewalls, wherein the injection tube is configured to pass through the channel with the second end of the injection tube extending outwardly of the basket bottom,
   wherein one or both of the outer basket sidewall and basket bottom define a plurality of openings whereby dissolved product passes out of the fertigation basket and into the container, and
   wherein the injection tube is configured to transport the dissolved product from the container to the outlet end of the flow tube.

2. The fluid injection system of claim 1 wherein the first end of the shroud includes a step defining a notch between the first end of the shroud and an inner wall of the flow tube wherein the notch is in fluid communication with the diverter port, and wherein the second end of the shroud defines a recess wherein the recess is in fluid communication with the injection port.

3. The fluid injection system of claim 1 wherein the flow tube further includes a weir adjacent to the shroud, wherein the weir further redefines at least a portion of the constricted fluid pathway as a further constricted fluid pathway.

4. The fluid injection system of claim 1 wherein the housing further includes a fill port configured to communicate with the cavity of the container and provide passage therethrough for refill product.

5. The fluid injection device of claim 4 wherein the housing further includes a fill plug configured to threadably engage the fill port to form a fluid-tight seal.

6. The fluid injection system of claim 1 wherein the container further includes a drain port including a drain in fluid communication with the cavity of the container.

7. The fluid injection system of claim 6 wherein the container further includes a valve coupled to the drain port, wherein the valve is selectively movable from a first position wherein the drain is closed to a second position wherein the drain is open.

8. The fluid injection system of claim 7 wherein the valve is a ball valve or a stopcock valve.

9. The fluid injection system of claim 1 further comprising a filter coupled to the second end of the injection tube.

10. The fluid injection system of claim 1 wherein the container is constructed of a transparent or translucent polymer material.

11. The fluid injection system of claim 10 wherein the polymer material is selected from the list consisting of high-density polyethylene, polycarbonate, polyethylene terephthalate, poly(methyl methacrylate), polypropylene, polyvinyl chloride and copolymers thereof.

12. The fluid injection system of claim 1 wherein the openings are selected to be smaller than a particle diameter of the dry product.

13. The fluid injection system of claim 1 wherein the outer basket sidewall includes a first wall surface and an opposite second wall surface, wherein the first wall surface includes vertically extending, spaced grooves extending through a first portion of the outer basket sidewall, and wherein the second wall surface includes horizontally extending, spaced grooves extending through a second portion of the outer basket sidewall whereby the openings are formed where the vertically extending, spaced grooves coincide with the horizontally extending, spaced grooves.

* * * * *